United States Patent [19]
Ahnn

[11] Patent Number: 5,936,672
[45] Date of Patent: Aug. 10, 1999

[54] HALF PIXEL MOTION ESTIMATOR

[75] Inventor: Jeong-Mo Ahnn, Seoul, Rep. of Korea

[73] Assignee: Daewoo Electronics Co., Ltd., Seoul, Rep. of Korea

[21] Appl. No.: 08/821,914

[22] Filed: Mar. 21, 1997

[30] Foreign Application Priority Data

Mar. 22, 1996 [KR] Rep. of Korea .................. 96-7973

[51] Int. Cl.[6] .................................................. H04N 7/32
[52] U.S. Cl. ........................ 348/416; 348/420; 348/699
[58] Field of Search .................................. 348/384, 390, 348/400–402, 407, 409–413, 415, 416, 420, 699; 382/232, 236, 238; H04N 7/137, 7/32

[56] References Cited

U.S. PATENT DOCUMENTS

| | | | |
|---|---|---|---|
| 4,937,666 | 6/1990 | Yang | 348/413 |
| 5,355,168 | 10/1994 | Sugiyama | 348/407 |
| 5,398,079 | 3/1995 | Liu et al. | 348/699 |
| 5,461,423 | 10/1995 | Tsukagoshi | 348/416 |
| 5,488,419 | 1/1996 | Hui et al. | 348/402 |
| 5,489,949 | 2/1996 | Jeong et al. | 348/699 |
| 5,493,344 | 2/1996 | Yu | 348/699 |
| 5,510,856 | 4/1996 | Jung | 348/409 |
| 5,583,580 | 12/1996 | Jung | 348/699 |
| 5,587,741 | 12/1996 | Kim | 348/416 |

FOREIGN PATENT DOCUMENTS

| | | |
|---|---|---|
| 0572904A2 | 12/1993 | European Pat. Off. . |
| 0613304A2 | 8/1994 | European Pat. Off. . |
| 0626791A2 | 11/1994 | European Pat. Off. . |
| 0637894A2 | 2/1995 | European Pat. Off. . |

*Primary Examiner*—Richard Lee
*Attorney, Agent, or Firm*—Pillsbury Madison & Sutro LLP

[57] ABSTRACT

A half pixel motion estimator, wherein a first search window having a constant size is formed with pixels stored in a previous buffer, and a first motion estimation is performed on the first window generating an integer vector and absolute errors, and a second search window having a constant size is formed by centering candidate blocks determined by an integer pixel motion vector, a second motion vector is outputted by comparing pixels of a reference block having a constant size to half pixels generated by interpolating the integer pixels in the second search window. The half pixel motion estimator comprises an interpolator, which performs an operation for couples of pixels inputted at a previous clock and couples of pixels inputted at a current clock to generate half pixels, in which the pixel couples in horizontal direction on the second search window are sequentially inputted in vertical direction; and a half pixel motion estimating unit. In the half pixel motion estimating unit: the pixels are sequentially inputted in vertical line direction of the reference block; the pixels of one vertical line-delayed reference block are sequentially inputted in horizontal line direction; an absolute errors are generated by performing operations for outputs from the interpolator; a half pixel motion vector or an integer motion vector having the minimum absolute error is selected by respectively comparing the absolute errors to the absolute error from the integer pixel motion estimation; and an integer pixel motion vector or a motion vector resulting from summing the integer pixel motion vector with the half pixel motion vector is outputted.

10 Claims, 6 Drawing Sheets x : 0 −17
y : 0 −17

FIG.5A

| CLK t | IP INPUT | IP OUTPUT | INPUT-A ||||
|---|---|---|---|---|---|---|
| | | | PE1-2 | PE3-5 | PE6-7 | PE8 |
| 0 | b(0,0)  b(1,0) | | | | | |
| 1 | b(0,1)  b(1,1) | | | | | |
| 2 | b(0,2)  b(1,2) | $b_1^1(0,0)$  $b_0^1(1,0)$ $b_0^1(0,1)$ | | $a(1,1)$ | | |
| 3 | b(0,3)  b(1,3) | $b_1^1(0,0)$  $b_0^1(1,1)$ $b_0^1(0,2)$ | $a(1,1)$ | $a(1,2)$ | | |
| ⋮ | ⋮ | $b_1^1(0,2)$  $b_0^1(1,2)$ $b_0^1(0,3)$ | $a(1,2)$ | $a(1,3)$ | | |
| 16 | b(0,16)  b(1,16) | ⋮ | ⋮ | ⋮ | ⋮ | ⋮ |
| 17 | b(0,17)  b(1,17) | $b_1^1(0,15) b_0^1(1,15)$ $b_0^1(0,16)$ | $a(1,15)$ | $a(1,16)$ | | |
| 18 | b(1,0)  b(2,0) | $b_1^1(0,16) b_0^1(1,16)$ $b_0^1(0,17)$ | $a(1,16)$ | | | |
| 19 | b(1,1)  b(2,1) | | | | | |
| 20 | b(0,3)  b(1,3) | $b_1^1(1,0)$  $b_0^1(2,0)$ $b_0^1(1,1)$ | | $a(2,1)$ | $a(1,1)$ | |
| 21 | b(1,3)  b(2,3) | $b_1^1(1,1)$  $b_0^1(2,1)$ $b_0^1(1,2)$ | $a(2,1)$ | $a(2,2)$ | $a(1,2)$ | $a(1,1)$ |
| ⋮ | ⋮ | $b_1^1(1,2)$  $b_0^1(2,2)$ $b_0^1(1,3)$ | $a(2,2)$ | $a(2,3)$ | $a(1,3)$ | $a(1,2)$ |
| 34 | b(1,16)  b(2,16) | ⋮ | ⋮ | ⋮ | ⋮ | ⋮ |
| 35 | b(1,17)  b(2,17) | $b_1^1(1,15) b_0^1(2,15)$ $b_0^1(1,16)$ | $a(2,15)$ | $a(2,16)$ | $a(1,16)$ | $a(1,15)$ |
| ⋮ | ⋮ | $b_1^1(1,16) b_0^1(2,16)$ $b_0^1(1,17)$ | $a(2,16)$ | | | $a(1,16)$ |
| 288 | b(16,0)  b(17,0) | ⋮ | ⋮ | ⋮ | ⋮ | ⋮ |
| 289 | b(16,1)  b(17,1) | | | | | |
| 290 | b(16,2)  b(17,2) | $b_1^1(16,0) b_0^1(17,0)$ $b_0^1(16,1)$ | | | $a(16,1)$ | |
| ⋮ | ⋮ | $b_1^1(16,1) b_0^1(17,1)$ $b_0^1(16,2)$ | | | $a(16,2)$ | $a(16,1)$ |
| 305 | b(16,16) b(16,17) | ⋮ | ⋮ | ⋮ | ⋮ | ⋮ |
| 306 | b(16,17) b(17,17) | $b_1^1(16,15) b_0^1(17,15)$ $b_0^1(16,16)$ | | | $a(16,16)$ | $a(16,15)$ |
| 307 | | $b_1^1(16,16) b_0^1(17,16)$ $b_0^1(16,17)$ | | | | $a(16,16)$ |

FIG.5B

| PE1-2 | PE3-5 | PE6-7 | PE8 |
|---|---|---|---|
|  |  |  |  |
|  |  |  |  |
|  | $a(1,1)-b_1^1(0,0)$  $a(1,1)-b_1^0(1,0)$<br>$a(1,1)-b_0^1(0,1)$ |  |  |
| $a(1,1)-b_1^1(0,1)$<br>$a(1,1)-b_0^1(1,1)$ | $a(1,2)-b_1^1(0,1)$  $a(1,2)-b_1^0(1,1)$<br>$a(1,2)-b_0^1(0,2)$ |  |  |
| $a(1,2)-b_1^1(0,2)$<br>$a(1,2)-b_0^1(1,2)$ | $a(1,3)-B_0^1(0,2)$  $a(1,3)-b_1^0(1,2)$<br>$a(1,3)-B_0^1(0,3)$ |  |  |
| ⋮ | ⋮ | ⋮ | ⋮ |
| $a(1,15)-b_0^1(0,15)$<br>$a(1,15)-b_0^1(1,15)$ | $a(1,16)-b_1^1(0,15)$ $a(1,16)-b_1^0(1,15)$<br>$a(1,16)-b_0^1(0,16)$ |  |  |
| $a(1,16)-b_1^1(0,16)$<br>$a(1,16)-b_0^1(1,16)$ |  |  |  |
|  |  |  |  |
|  | $a(2,1)-b_1^1(1,0)$  $a(2,1)-b_1^0(2,0)$<br>$a(2,1)-b_0^1(1,1)$ | $a(1,1)-b_1^1(1,0)$<br>$a(1,1)-b_0^1(1,1)$ |  |
| $a(2,1)-b_1^1(1,1)$<br>$a(2,1)-b_0^1(2,1)$ | $a(2,2)-b_1^1(1,1)$  $a(2,1)-b_1^0(2,1)$<br>$a(2,2)-b_0^1(1,2)$ | $a(1,2)-b_1^1(1,1)$<br>$a(1,2)-b_0^1(1,2)$ | $a(1,1)-b_1^1(1,1)$ |
| $a(2,2)-b_1^1(1,2)$<br>$a(2,2)-b_0^1(2,2)$ | $a(2,3)-b_1^1(1,2)$  $a(2,3)-b_1^0(2,2)$<br>$a(2,3)-b_0^1(1,3)$ | $a(1,3)-b_1^1(1,2)$<br>$a(1,3)-b_0^1(1,3)$ | $a(1,2)-b_1^1(1,2)$ |
| ⋮ | ⋮ | ⋮ | ⋮ |
| $a(2,15)-b_1^1(1,15)$<br>$a(2,15)-b_0^1(2,15)$ | $a(2,16)-b_1^1(1,15)$ $a(2,16)-b_1^0(2,15)$<br>$a(2,16)-b_0^1(1,16)$ | $a(1,16)-b_1^1(1,15)$<br>$a(1,16)-b_0^1(1,16)$ | $a(1,15)-b_1^1(1,15)$ |
| $a(2,16)-b_1^1(1,16)$<br>$a(2,16)-b_0^1(2,16)$ |  |  | $a(1,16)-b_1^1(1,16)$ |
| ⋮ | ⋮ | ⋮ |  |
|  |  |  |  |
|  |  | $a(16,1)-b_1^1(16,0)$<br>$a(16,1)-b_0^1(16,1)$ |  |
|  |  | $a(16,2)-b_1^1(16,1)$<br>$a(16,2)-b_0^1(16,2)$ | $a(16,1)-b_1^1(16,1)$ |
|  | ⋮ | ⋮ | ⋮ |
|  |  | $a(16,16)-b_1^1(16,15)$<br>$a(16,16)-b_0^1(16,16)$ | $a(16,15)-b_1^1(16,15)$ |
|  |  |  | $a(16,16)-b_1^1(16,16)$ |

HALF PIXEL MOTION ESTIMATOR

BACKGROUND OF THE INVENTION

1. Field of the Invention

The present invention relates to a motion estimator for compressing image signals, and more particularly to a half pixel motion estimator for estimating the motion of half pixels by interpolating the integer pixels (pel).

2. Description of the Prior Art

Related arts for a half pixel motion compensation, which are used for an image compression, are disclosed in U.S. Pat. Nos. 5,461,423, 5,488,419, 5,489,949, and 5,493,344. U.S. Pat. No. 5,489,949 discloses in detail a method and apparatus for motion estimation utilizing an error value for determining a motion vector.

In general, a motion estimation is a method for compressing images in image processing methods for determining a motion vector, which represents a motion difference between the pixels of previous frame and the pixels of current frame in successive image signals so as to transmit only the motion vector and the differential pulse code modulation (DPCM) value instead of whole image data.

A block matching algorithm (BMA), widely used in motion estimation, is a method that uses a motion vector in order to estimate block image within the previous frame with the corresponding block image within the current image, under the assumption that a movement of image is shifted parallel in horizontal direction or vertical direction. The BMA commonly uses 8×8 and 16×16 sized blocks for motion estimation.

In order to search a block of the previous frame closely similar to the reference block of the current frame, the previous frame is searched within a constant range centering the reference block of the previous frame. Here, the constant range is a "search window", and the difference between a candidate block and the reference block within the search window is a distortion.

In addition, a "full search block matching algorithm" compares all candidate blocks with the reference block within the search window. In order to search the most similar block to the reference block, the difference between $f_1(x-a, y-b)$ and $f_2(x, y)$ is calculated. The minimum difference between $f_1(x-a, y-b)$ and $f_2(x, y)$ is designated as a motion vector. Like the above, a Mean Absolute Error (MAE) method is used to obtain a minimum error value between the blocks. MAE is achieved by the following equation 1.

$$E_{abs} = \frac{1}{|B|^2} \sum\sum_{x,y \in B} |f_1(x-a, y-b) - f_2(x, y)| \quad \text{equation 1}$$

In equation 1, the "$E_{abs}$" and the "B" are respectively a MAE value and a block size. Accordingly, the (a, b) that allows the $E_{abs}$ to be minimum is the motion vector.

In the apparatus for compressing and coding images like MPEG2, the motion estimation is performed by two steps in order to perform further detailed motion estimation.

As illustrated in FIG. 1A, the motion estimation is conventionally performed by the following steps. Firstly, an initial motion estimation is performed within a broad search window SW1' in integer pixel units in order to produce a first motion vector MV1'. Secondly, a half pixel is interpolated by calculating the adjacent pixels by centering the motion vector MV1' in order to perform the half pixel motion estimation within a narrow search window SW2', and more detailed motion vector MV2' is produced.

However, an interpolator, which is comprised in the motion estimator of the prior arts needs a divider for generating the half pixel. The divider has a problem that its size is increased when embodied with a semiconductor integrated circuit having an array processor arrangement.

SUMMARY OF THE INVENTION

In view of the foregoing, it is an object of the invention to provide a half pixel motion estimator of compact and simplified structure to compress sequential image signals by utilizing a shifter for interpolating integer pixels.

To achieve the objects, the present invention provides a half pixel motion estimator for calculating an integer motion vector and corresponding absolute error value by estimating an integer motion for a macro block in the first search window, where a second search window is formed for performing a half pixel motion estimation of the macro block, where the half pixel motion estimation comprises an interpolator for generating a half pixel by summing and shifting the delayed pixels sequentially inputted from the second search window and a couple of current input pixels; and a half pixel motion estimating means, wherein the pixel data of the macro block and one horizontal line-delayed pixel data are inputted. An absolute error value of the half pixel motion is calculated by processing the data from the interpolator and received pixel data. A minimum absolute error value is selected and outputted by comparing the absolute error value from the half pixel motion estimation with the absolute error value from the integer motion estimation.

BRIEF DESCRIPTION OF THE DRAWINGS

The above and other objects, features, and advantages of the present invention will be apparent from the following detailed description of the preferred embodiments of the invention in conjunction with the accompanying drawings, in which:

FIGS. 5A and 5B are tables illustrating a time sequence in accordance with a preferred embodiment of the present invention:

DESCRIPTION OF THE PREFERRED EMBODIMENT

Reference will now be made in detail to the present invention, examples of which are illustrated in the accompanying drawings. Wherever possible, the same reference numbers will be used throughout the drawings to refer to the same or like parts.

Figure 1A:
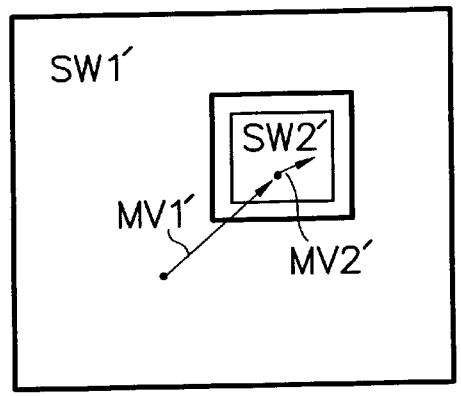
FIG. 1A is a conceptual diagram for explaining the two step motion estimation.

FIG. 1A shows a conceptual diagram for explaining a further detailed motion estimation. In further detailed motion estimation, a second motion estimation on a narrow search window SW2' is performed following a first motion estimation on a broad search window SW1'.

Figure 1B:
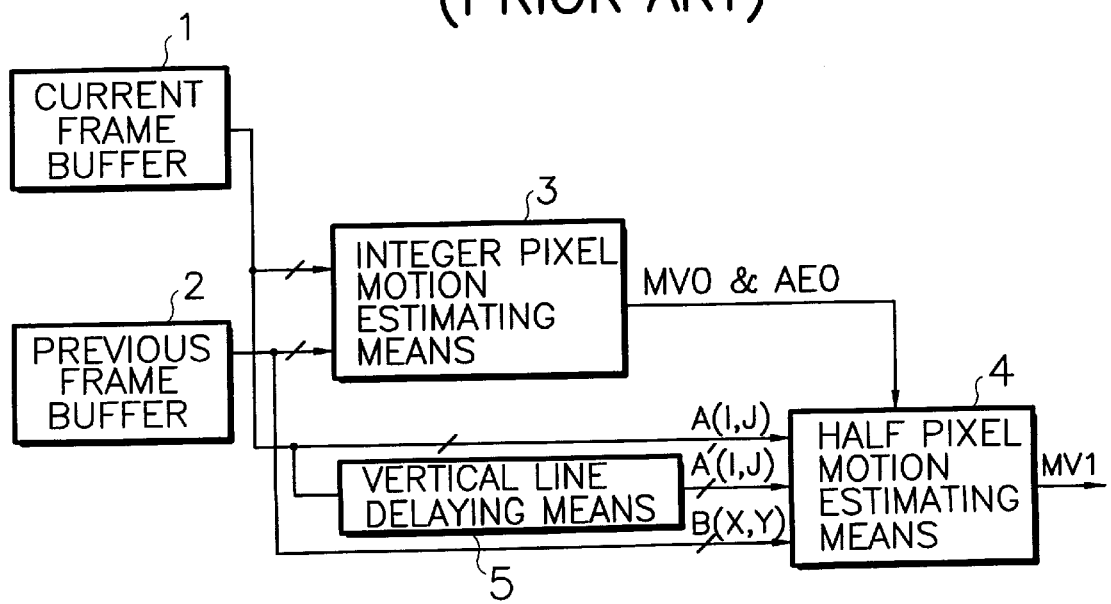
FIG. 1B is a view illustrating a conventional motion estimator.

FIG. 1B shows a block diagram of a conventional motion estimator and a motion estimator of the present invention. The motion estimator comprises a current frame buffer 1, a previous frame buffer 2, an integer pixel motion estimating means 3, a half pixel motion estimating means 4, and a vertical line delaying means 5.

In FIG. 1B, image data (pixels) within the current frame for estimating the motion are stored in the current frame buffer 1. The image data within the current frame can be accessed in macro block units. Image data within the previous frame serve as the reference image of the motion estimation, and they are stored in the previous frame buffer 2. The image data within the previous frame forms search windows SW1' and SW2' having a constant size.

The pixels of the reference block, for the current frame, from the current frame buffer 1 is inputted to the integer pixel motion estimating means 3. The pixels of candidate blocks, within the search window SW1', from the previous frame buffer 2 are inputted to the integer pixel motion estimating means 3. In integer pixel motion estimating means 3, a motion vector MV0 having a minimum absolute error (or a distortion) and an absolute error AE0 are outputted after comparing the pixels of the reference block to the pixels of the candidate blocks on the search window.

The pixels within a constant range of the motion vector MV0, which are generated from the integer pixel motion estimating means 3, are inputted to the half pixel motion estimating means 4. The half pixel motion estimating means 4 compares the pixels of the reference block inputted from the current frame buffer 1 with the pixels of the candidate blocks inputted from the previous frame buffer 2. At this time, half pixels are generated on the narrow search window SW2, and an accurate motion vector is generated by estimating the motion of the half pixels. The pixels of the reference block can be directly inputted into the half pixel motion estimating means 4, or inputted to the vertical line delaying means 5 in one line-delayed state.

Figure 2A:
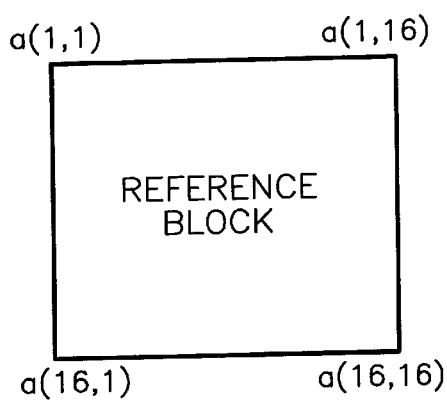
FIG. 2A is a view illustrating 16×16 macro block for motion estimation.

FIG. 2A shows a 16×16 reference block in accordance with the present invention. The 16×16 macro block is composed of 256 pixels from a(1,1) to a(16,16).

Figure 2B:
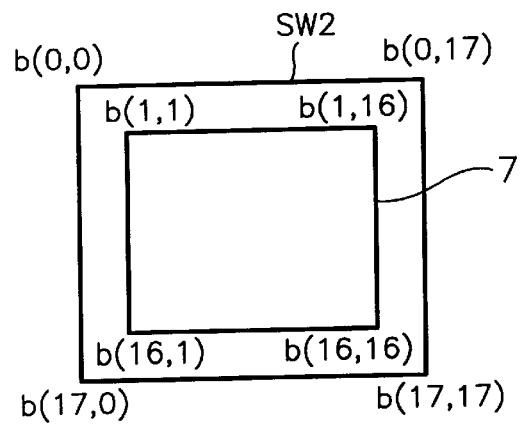
FIG. 2B is a view illustrating a search window for half pixel motion estimation.

FIG. 2B shows the search window SW2 for the half pixel motion estimation in accordance with the present invention. The search window SW2 centers candidate blocks 7 having motion vectors processed by the first motion estimation (namely an integer pixel motion estimation). Half pixels are generated by interpolating the integer pixels within the search window SW2. Accordingly, nine candidate blocks (eight half pixel candidate blocks and an integer pixel candidate block) exit in the search window. Namely, the search window SW2 is formed by extending one by one pixel centering the candidate blocks 7 from the first motion estimation; and the half pixels are generated by interpolating the pixels b(0,0)–b(17,17) of the search window SW2, thereby forming eight candidate blocks.

Finally, the half pixel motion estimation searches the motion vector having the minimum absolute error, namely a second motion vector (a final motion vector), by comparing respectively the absolute error of the candidate blocks generated in the first motion estimation to the absolute errors of the eight half pixel candidate blocks.

Figure 3:
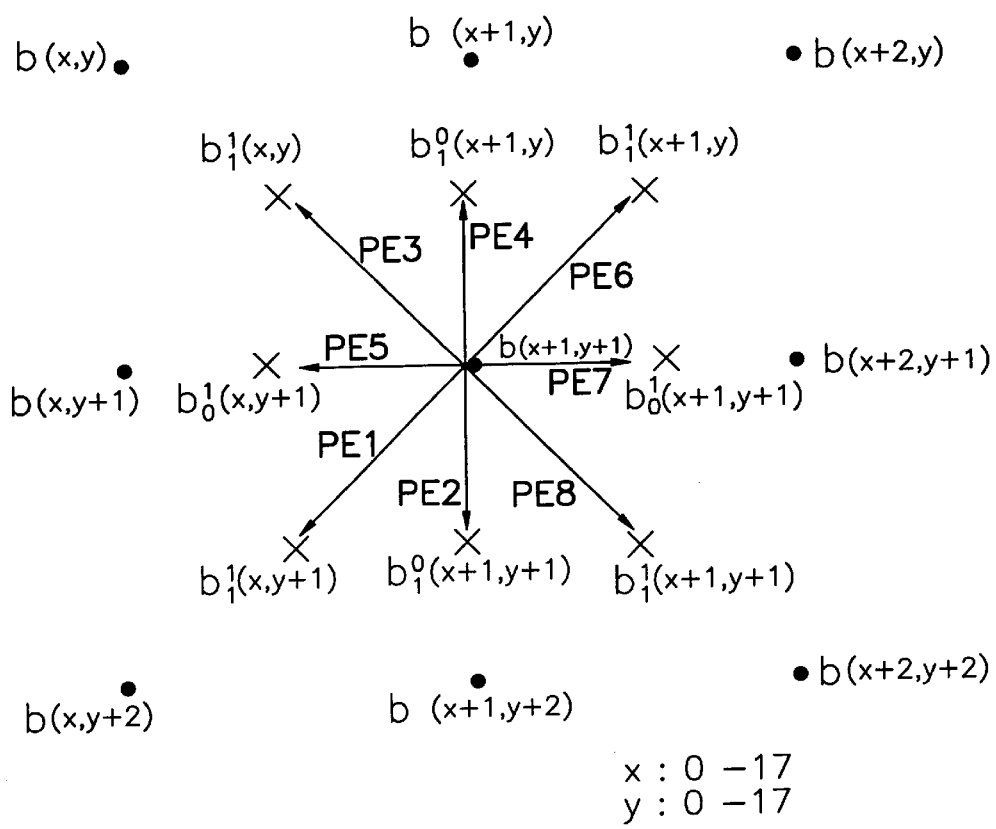
FIG. 3 is a conceptual diagram for explaining a half pixel motion estimation.

FIG. 3 shows certain nine integer pixels b(x,y), b(x+1,y), b(x+2,y), b(x,y+1), b(x+1,y+1), b(x+2,y+1), b(x,y+2), b(x+1,y+2), b(x+2,y+2) in the search window SW2. In FIG. 3, the dot and "x" respectively indicate integer pixels and half pixels generated by interpolating the integer pixels. Each arrow indicates half pixel motion vectors for the eight candidate blocks with [b(x+1, y+1)]. Reference numerals PE1 to PE 8 on each arrow respectively indicate the processing elements for generating the half pixel motion vectors.

In FIG. 3, the $b^0_1$ indicates a half pixel (a half pixel of vertical direction), which is generated by interpolating the two adjacent integer pixels of vertical direction. Additionally, the $b^1_0$ and $b^1_1$ indicate respectively a half pixel (a half pixel of horizontal direction), which is generated by interpolating the two adjacent integer pixels of horizontal direction, and a half pixel (a half pixel of diagonal direction), which is generated by interpolating the four adjacent integer pixels forming a quadrangle.

The above $b^0_1(x+1,y)$, $b^1_0(x,y+1)$ and $b^1_1(x,y)$ are generated by the following equations.

$b^0_1(x+1,y) = \{b(x+1,y)+b(x+1,y+1)\}//2$      equation 2

$b^1_0(x,y+1) = \{b(x,y+1)+b(x+1,y+1)\}//2$      equation 3

$b^1_1(x,y) = \{b(x,y)+b(x+1,y)+b(x,y+1)+b(x+1,y+1)\}//4$      equation 4

Figure 4:
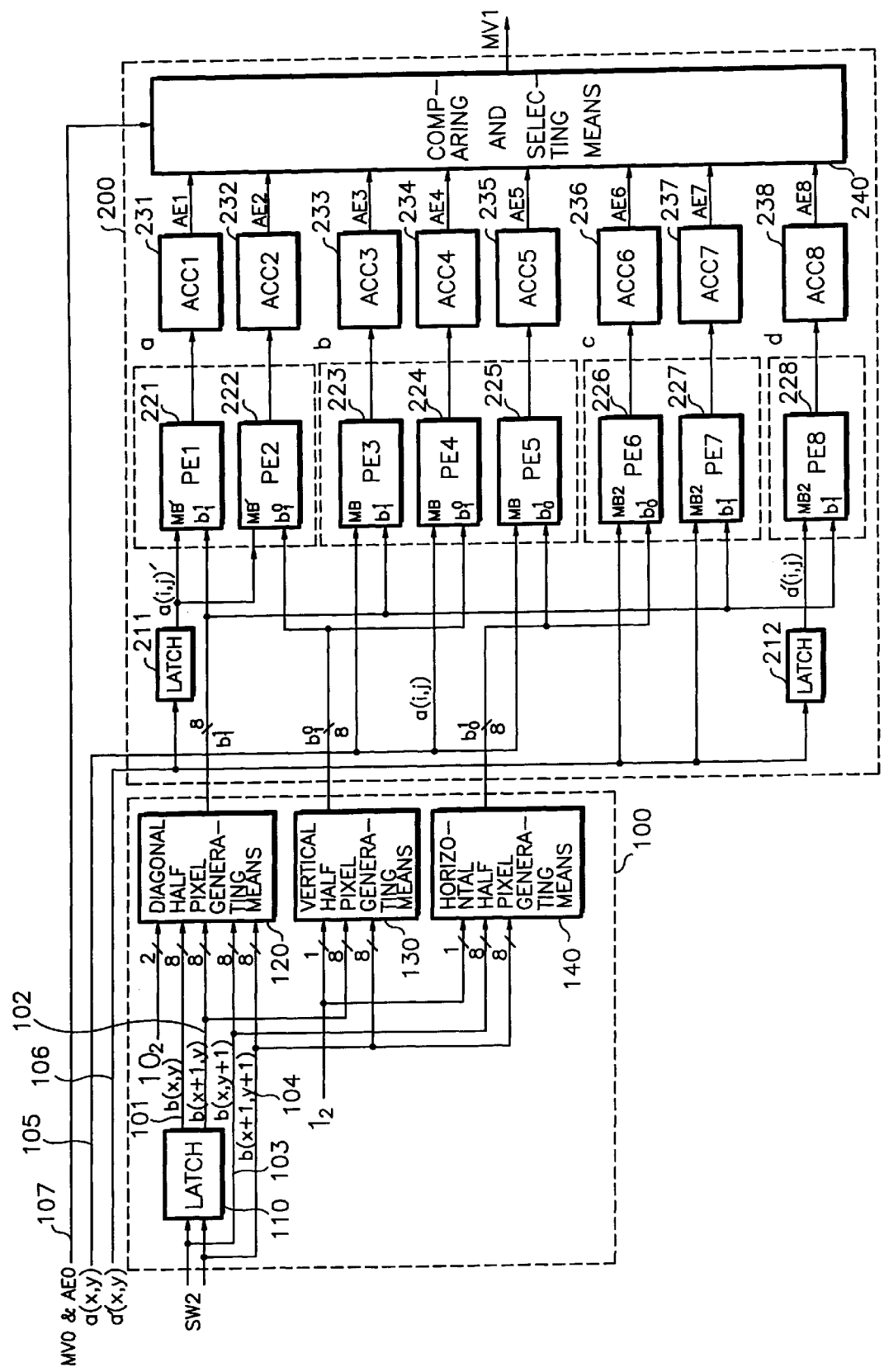
FIG. 4 is a block diagram illustrating a half pixel motion estimator in accordance with a preferred embodiment of the present invention.

As illustrated in FIG. 4, the half pixel motion estimator of the present invention is largely divided into an interpolator 100 and a half pixel motion estimating means 200. The interpolator 100 comprises a latch 110 and three half pixel generating means 120, 130, 140. The half pixel motion estimating means 200 comprises two latches 211, 212 and eight processing elements 221–228, eight accumulators 231–238, and a comparing and selecting means 240.

As illustrated in FIG. 2B, the two pixels from the search window SW2 are sequentially inputted from the search window SW2 to the interpolator 100 in vertical direction. One pixel is composed of 8 bit data in accordance with preferred embodiment of the present invention. Inputted two pixels are latched by the latch 110. The new two pixels and previous pixels are inputted to the clock located in the line of the lines 101–104. Namely, as illustrated in FIG. 3, when b(x,y) and b(x+1,y+1) pixels are inputted to the previous clock in the interpolator 100, and b(x,y+1) and b(x+1,y+1) pixels are subsequently inputted at the current clock, the b(x,y) and the b(x+1,y) that are latched at the previous clock respectively appears on the lines 101, 102, and the b(x,y+1) and the b(x+1,y+1) that are inputted at the current clock appears respectively on the lines 103, 104.

Accordingly, the pixels b(x,y), b(x+1,y), b(x,y+1), and b(x+1,y+1) are inputted and calculated in the diagonal half pixel generating means 120 and the half pixel of diagonal direction $b^1_1$ is outputted. The pixels b(x+1,y) and b(x+1, y+1) are inputted and calculated in the vertical half pixel generating means 130 and the half pixel of vertical direction $b^0_1$ is outputted. The pixels b(x,y+1) and b(x+1,y +1) are inputted and calculated in the horizontal half pixel generating means 140 and the horizontal half pixel $b^1_0$ is outputted.

Figure 7:
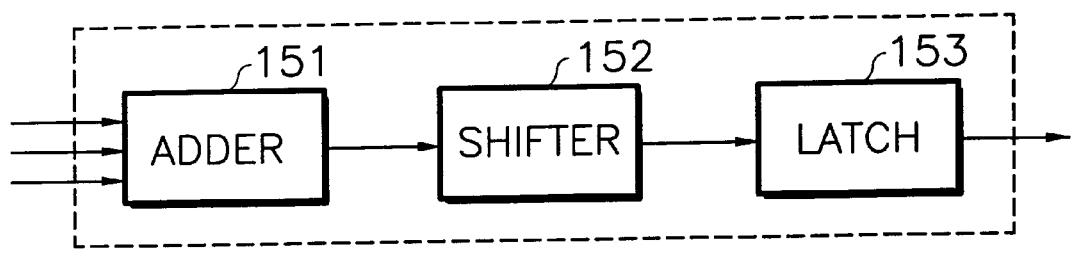
FIG. 7 is a detailed block diagram of a half pixel generating means illustrated in FIG. 4.

Each half pixel generating means 120, 130, 140, as illustrated in FIG. 7, comprises an adder 151, an shifter 152, and a latch 153. As described in detail, four pixels of 8 bits and $2_{10}$ ($10_2$) are added in the adder of the diagonal half pixel generating means 120. In the shifter of the diagonal half pixel generating means 120, an output from the adder is shifted twice. At this time, of the 10 bits outputted from the adder, only 8 bits from the Most Significant Bit (MSB) to the eighth bit are outputted from the shifter.

In addition, in adders of the vertical half pixel and horizontal half pixel generating means 130, 140, two pixels having 8 bits and $1_2$ are added. In the shifters of the vertical half pixel and horizontal half pixel generating means 130, 140, the outputs from the adder are shifted once. At this time, of the 9 bits output from the adder, only 8 bits from a Most Significant Bit (MSB) to the eighth bit are outputted from the shifter. Here, in order to generate an integer by shifting (namely a division), a binary digit "$10_2$" is added in the diagonal half pixel generating means 120 and a binary digit "$1_2$" is added in the vertical half pixel and horizontal half pixel generating means 130, 140.

As illustrated in FIG. 4, the pixels of the reference block are inputted sequentially in the half pixel motion estimating means 200. The pixels a(1,1) to a(16,16) of the reference block are sequentially inputted to the line 105 in vertical direction. The pixels of a vertical line that is delayed more than the line 105 are sequentially inputted in the line 106. Namely, the first vertical pixels of the reference block a(1,1) to a(1,16) are inputted in the line 106 when the second vertical pixels of the reference block a(2,1) to a(2,16) are inputted in the line 105. In addition, non-delayed input pixels of the vertical line are latched in the latch 211, thus they are delayed by one clock. The non-delayed input pixels are outputted to the processing elements 221, 222. The vertical line delayed-input pixels are latched in the latch 212 so that they are delayed again by one more clock. The delayed input pixels are outputted to the processing element 228.

In FIG. 4, the processing elements 221–228 forming four groups a, b, c, d represents the pixels of the reference block that are processed in the same time with the half pixels. Processing the pixel a(i,j)' of the reference block from the line 105 that is delayed by the latch 211 and the half pixels inputted from the interpolator 100 at the same time as the pixel a(i,j)', is performed by the processing elements 221, 222 of the group a. Processing the pixel a(i,j) of the reference block inputted through the line 105 and the half pixels inputted from the interpolator 100 at the same time as the pixel a(i,j), is performed by the processing elements 223, 224, 225 of the group b. Processing the pixel a'(i,j) of the one vertical line-delayed reference block inputted through the line 106, and the half pixels inputted from the interpolator 100 at the same time as the pixel a'(i,j), is performed by the processing elements 226, 227 of the group c. Processing the pixel a'(ij)' of the one vertical line-delayed reference block inputted through the line 106, which is delayed once more by the latch 212, and half pixels inputted from the interpolator 100 at the same time as the pixel a'(i,j)', is performed by the processing element 228 of the group d.

Figure 6:
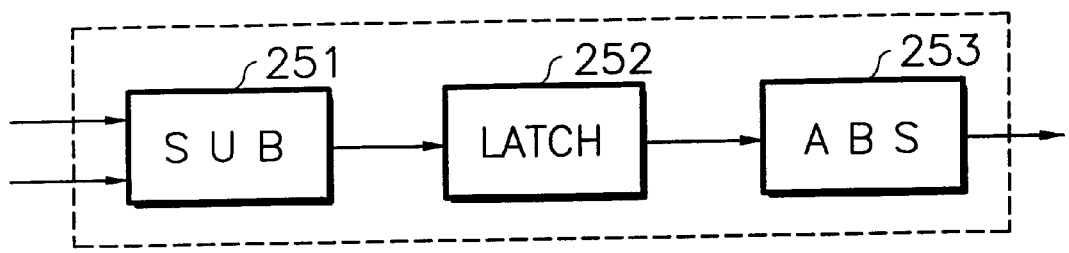
FIG. 6 is a detailed block diagram of processing elements illustrated in FIG. 4.

As illustrated in FIG. 6, each processing element 221–228 comprises a subtracter 251, a latch 252, and an absolute value calculator 253.

Calculating the differences between the pixels of the reference block and the half pixels generated by the interpolator 100 are performed by the subtracter 251. The difference is latched by the latch 252 and absolute value is calculated by the absolute value calculator 253. Like the above steps, absolute errors for each pixel are calculated by the processing elements 221–228, and the absolute errors for each pixel are continuously accumulated in the accumulators 231–238. The absolute errors between the reference block and the corresponding candidate blocks are stored in the accumulators 231–238 after performing the operation for the whole pixels of the macro block.

As illustrated in FIG. 3, each processing element 221–228 calculates errors for the half pixel motion estimation in eight directions. Accordingly, the comparing and selecting means 240 outputs a motion vector of candidate block having the minimum error after comparing the error AE0 from the first motion estimation to the errors from AE1–AE8 from accumulators 231–238.

For example, if the absolute error from the first motion estimation is the minimum error when comparing to each output from the eight accumulators 231–238, the final motion vector is the motion vector MV0 from the first motion estimation. If the absolute error from the accumulator is the minimum error, the resulting vector is the sum of the half pixel motion vector from the accumulator and the motion vector from the first motion estimation. In short, when the value of the first motion vector (MV0) is MV(m,n), the second motion vector is determined as shown in the following table 1.

TABLE 1

Second motion vector in accordance with the minimum error

| minimum error value | second motion vector(MV1) | reference |
|---|---|---|
| AE0 | MV(m,n) | integer vector |
| AE1 | MV(m−0.5,n+0.5) | PE1 |
| AE2 | MV(m,n+0.5) | PE2 |
| AE3 | MV(m−0.5,n−0.5) | PE3 |
| AE4 | MV(m,n−0.5) | PE4 |
| AE5 | MV(m−0.5,n) | PE5 |
| AE6 | MV(m+0.5,n−0.5) | PE6 |
| AE7 | MV(m+0.5,n) | PE7 |
| AE8 | MV(M+0.5,n+0.5) | PE8 |

As shown in Table 1, the absolute errors AE1–AE8 stored in each accumulator 231–238 are compared to the absolute error AE0 from the first motion estimation by the comparing and selecting means 240. The half pixel motion vector (−0.5, +0.5) in FIG. 3 is selected when the absolute error AE1 from the first accumulator 231 is the minimum absolute error. Accordingly, the sum of the motion vector MV(m,n) and the half pixel motion vector (−0.5, +0.5), namely MV(m−0.5, n+0.5) is the final resulting motion vector MV1.

Next, the preferred embodiment of construction like the above will be described in detail according to FIGS. 5A and 5B.

As illustrated in FIGS. 5A and 5B, the pixel couple b(0,0) and b(17,17) of the search window are respectively inputted to the interpolator 100 according to the clock. Namely, a couple of pixel data like b(0,0), b(1,0) of clock 0, b(0,1),b(1,1) of clock 1, and b(0,2),b(1,2) of clock 2 are sequentially inputted according to the order of the vertical line in the interpolator 100. The three half pixels from the clock 2 (a half pixel of diagonal direction, a half pixel of vertical direction, and a half pixel of horizontal direction) are sequentially outputted from the interpolator 100. Namely, $b^1_1(0,0)$, $b^0_1(1,0)$, and $b^1_0(0,1)$ are outputted at the clock 2, and $b^1_1(0,1)$, $b^0(1,1)$, and $b^1_0(0,2)$ are outputted at the clock 3 from the interpolator 100.

In addition, the pixels a(1,1)–a(16,16) of the reference block in FIG. 2 are sequentially inputted in the processing elements 221–228 in the order of the vertical line according to the clock. At this time, the same pixels of the reference block are inputted according to each group a, b, c, d of the processing elements 221–228, to be processed with the outputs (namely half pixels) from the interpolator 100.

Namely, the first pixel a(1,1) of the first vertical line of the reference block is inputted at the clock 2 in the processing elements 223–225, to be processed with the half pixels $b^1_1(0,0)$, $b^0_1(1,0)$, and $b^1_0(0,1)$ outputted from the interpolator 100. The pixels "a(1,1)–$b^1_1(0,0)$", a(0,0)–$b^0_1(1,0)$, and a(1,1)–$b^1_0(0,1)$ are processed by the third, fourth, and fifth processing elements 223, 224, 225, respectively. The absolute errors generated by the above operations are stored in the each accumulators 233–235 corresponding to each processing elements 223–225.

Next, the second pixel a(1,2) of the first vertical line of the reference block, inputted at the clock 3, is processed by the third, fourth, and fifth processing elements 223–225. The one clock-delayed first pixel a(1,1) from the latch 211 is processed by the first and second processing elements 221, 222. Namely, the pixels a(1,2)–$b^1_1$(0,1), a(1,2)–$b^0_1$(1,1), and a(1,2)–$b^1_0$(0,2) are processed respectively by the third, fourth, and fifth processing elements 223–225, which output the absolute errors to the corresponding accumulators 233–235. The pixels a(1,1)–$b^1_1$(0,1) from clock 3 is processed by the first processing element 221, which outputs the absolute error to the first accumulator 231. The absolute error value is outputted from the second processing element 222 to the second accumulator 232 after processing a(1,1)-$b^0_1$(0,1).

In FIGS. 5A and 5B, the pixels that form the first vertical line of the reference block are sequentially processed by the processing elements 221–225, and the pixels that form the second vertical line of the reference block are also sequentially processed by the processing elements 221–225. The pixels forming the first vertical line and the second vertical line of the reference block are inputted at the same clock. Namely, when the pixel a(1,1) of the first vertical line of the reference block is delayed by one line before being inputted to the processing elements 226–228 through the line 106, compared to the half pixels inputted to the same clock, the pixels a(1,1)–$b^1_1$(1,0) is processed by the sixth processing element 226, and the absolute error is ouputted to the sixth accumulator 236. The pixels a(1,1)–$b^1_0$(1,1) is processed by the seventh processing element 227, and the absolute error is outputted to seventh accumulator 237. At this time, the first pixel a(1,1) of the first vertical line of the reference block delayed by one vertical line is latched by the latch 212 to be delayed again by one more clock.

At the next clock, the next pixel a(1,2) together with a(1,2)–$b^1_1$(1,1) and a(1,2)–$b^1_0$(1,2) is processed in the sixth and seventh processing elements 226, 227. In addition, at the same clock as the above, the latched first pixel a(1,1) together with a(1,1)–$b^1_1$(1,1) is processed in the eighth processing element 228, and the absolute error is outputted to the eighth accumulator 238.

The operation for the whole pixels is completed when the absolute errors processed by each processing element are stored in each corresponding accumulator. Accordingly, the absolute errors for one reference block and eight half pixel candidate blocks are stored respectively in the accumulators 231–238. Finally, as shown in table 1, the motion vector having the minimum absolute error is outputted from the comparing and selecting means 240 when the whole pixels of the reference block is completely processed.

As described above, the half pixel motion estimator of the present invention has the advantage that the operation of the interpolator is performed by the shifter, and the operation for the half pixel motion estimation is performed by a sequential method, thus eliminating the need for an array processors. Accordingly, the half pixel motion estimator of the present invention of compact size with a faster processing speed can be realized, since it is comprised of a simple semiconductor integrated circuit.

While this invention has been described in connection with what is presently considered to be the most practical and preferred embodiments, it is to be understood that the invention is not limited to the disclosed embodiment, but, on the contrary, it is intended to cover various modifications and equivalent arrangements comprised within the spirit and scope of the appended claims.

What is claimed is:

1. A half pixel motion estimator, wherein a first motion estimation is performed on a first search window formed onto pixels stored in a previous frame buffer to generate an integer pixel motion vector and a first absolute error, and a second motion estimation is performed by comparing pixels of a reference block with half pixels generated by interpolating integer pixels on a second search window formed around candidate blocks determined by the integer pixel motion vector to generate a final motion vector, said half pixel motion estimator comprising:

an interpolator for receiving a couple of pixels adjacent in horizontal direction on the second search window in a sequentially inputted vertical direction, and generating the half pixels from a couple of pixels received at a previous clock and a couple of pixels received at a current clock; and half pixel motion estimating means for receiving the pixels of the reference block and one vertical line delayed pixels of the reference block in vertical direction sequentially, obtaining a second absolute errors from the half pixels provided from said interpolator and the pixels received therein, comparing the first absolute error and the second absolute errors, and providing the sum of the integer pixel motion vector and a half pixel motion vector having a minimum absolute error or the integer pixel motion vector as the final motion vector according to the comparison result, wherein said interpolator comprises:

delaying means for latching the couple of pixels received from the second search window at the previous clock in order to delay the couple of pixels by one clock;

diagonal half pixel generating means for generating half pixels of diagonal direction by adding and shifting twice the couple of pixels delayed in said delaying means, the couple of pixels received at the current clock, and a certain binary digit;

vertical half pixel generating means for generating half pixels of vertical direction by adding and shifting once a second pixel among the couple of pixels delayed in said delaying means, a second pixel among the couple of pixels received at the current clock, and a certain binary digit; and horizontal half pixel generating means for generating half pixels of horizontal direction by adding and shifting once a couple of pixels received at the current clock, and a certain binary digit.

2. The half pixel motion estimator of claim 1, wherein the delaying means is embodied with a latch.

3. The half pixel motion estimator of claim 1, wherein said diagonal half pixel generating means comprises an adder for adding four pixels of the second search window to a binary digit "10"; a shifter for shifting twice the outputs from the adder; and a latch for temporarily storing outputs from the shifter.

4. The half pixel motion estimator of claim 1, wherein said vertical half pixel generating means comprises an adder for adding two pixels of the second search window to a binary digit "1"; a shifter for shifting once the outputs from the adder; and a latch for temporarily storing outputs from the shifter.

5. The half pixel motion estimator of claim 1, wherein said horizontal half pixel generating means comprises an adder for adding two pixels of the second search window to a binary digit "1"; a shifter for shifting once the outputs from the adder; and a latch for temporarily storing outputs from the shifter.

6. The half pixel motion estimator of claim 1, wherein said half pixel motion estimating means comprises:

first delaying means for delaying a current pixel of the reference block by one clock;

second delaying means for delaying the pixels of the one vertical line-delayed pixels of the reference block by one clock;

a plurality of processing elements for receiving the current pixel of the reference block, an one clock delayed pixels from the first delaying means, the one vertical line delayed pixels of the reference block, an one vertical line and one clock delayed pixels from the second delaying means, and outputs from the interpolator, and providing absolute errors for each pixel therefrom;

a plurality of accumulators for accumulating and adding the absolute errors from said processing elements, and storing the second absolute errors for the half pixel motion vector therein when operations for whole pixels of the reference block are completed; and comparing and selecting means for comparing respectively the second absolute errors outputted from said accumulators to the first absolute error generated by a first motion estimation, outputting the integer pixel motion vector if the first absolute error generated by the first motion estimation is the minimum absolute error, and outputting the sum of the half pixel motion vector and integer pixel motion vector if one of the second absolute errors from said accumulators is the minimum absolute error.

7. The half pixel motion estimator of claim 6, wherein said first delaying means is embodied with a latch.

8. The half pixel motion estimator of claim 6, wherein said second delaying means is embodied with a latch.

9. The half pixel motion estimator of claim 6, wherein said processing elements comprise:

a first processing element for outputting an absolute error of the pixels by performing operation for one clock-delayed current pixel of the reference block and the half pixels of diagonal direction inputted at the same clock;

a second processing element for outputting an absolute error of the pixels by performing operation for one clock-delayed current pixel of the reference block and the half pixels of vertical direction inputted at the same clock;

a third processing element for outputting an absolute error of the pixels by performing operation for the current pixel of the reference block and the half pixels of diagonal direction inputted at the same clock;

a fourth processing element for outputting an absolute error of the pixels by performing operation for the current pixel of the reference block and the half pixels of vertical direction inputted at the same clock;

a fifth processing element for outputting an absolute error of the pixels by performing operation for the current pixel of the reference block and the half pixels of horizontal direction inputted at the same clock;

a sixth processing element for outputting an absolute error of the pixels by performing operation for one vertical line-delayed pixel of the reference block and the half pixels of diagonal direction inputted at the same clock;

a seventh processing element for outputting an absolute error of the pixels by performing operation for one vertical line-delayed pixel of the reference block and the half pixels of horizontal direction inputted at the same clock; and an eighth processing element for outputting an absolute error of the pixels by performing operation for one vertical line-delayed and one clock-delayed pixel of the reference block and the half pixels of diagonal direction inputted at the same clock.

10. The half pixel motion estimator of claim 9, wherein said processing elements comprise a subtracter for subtracting the pixels of the reference block and the half pixels from the interpolator to generate errors; a latch for temporarily storing said errors; and an absolute value calculator for generating absolute errors for stored in the latch errors.

* * * * *